(12) United States Patent
Fujimori et al.

(10) Patent No.: US 7,541,416 B2
(45) Date of Patent: Jun. 2, 2009

(54) POLYCARBONATE COPOLYMER AND PROCESS FOR PRODUCING THE SAME

(75) Inventors: Takayasu Fujimori, Tsukuba (JP); Noriyuki Kato, Tsukuba (JP); Masamichi Mizukami, Tsukuba (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 256 days.

(21) Appl. No.: 10/576,417

(22) PCT Filed: Nov. 26, 2003

(86) PCT No.: PCT/JP03/15068

§ 371 (c)(1), (2), (4) Date: Apr. 19, 2006

(87) PCT Pub. No.: WO2005/052025

PCT Pub. Date: Jun. 9, 2005

(65) Prior Publication Data

US 2007/0123685 A1    May 31, 2007

(51) Int. Cl.
*C08G 64/00*   (2006.01)
*C08G 63/02*   (2006.01)

(52) U.S. Cl. ............... 528/196; 428/401; 428/500; 428/690; 524/445; 524/449; 525/437; 525/439; 528/198; 528/219

(58) Field of Classification Search ............... 428/401, 428/500, 690, 411, 412; 525/437, 439; 528/196, 528/198, 219; 524/445, 449
See application file for complete search history.

(56) References Cited

U.S. PATENT DOCUMENTS

| | | | | |
|---|---|---|---|---|
| 6,316,576 B1 * | 11/2001 | Fujimori et al. | ............. | 528/196 |
| 6,355,768 B1 * | 3/2002 | Fujimori et al. | ............. | 528/196 |
| 6,359,103 B1 * | 3/2002 | Nagai et al. | ................. | 528/198 |
| 6,376,641 B2 * | 4/2002 | Nagai et al. | ................. | 528/198 |

FOREIGN PATENT DOCUMENTS

| JP | 6-25398 | 2/1994 |
|---|---|---|
| JP | 7-109342 | 4/1995 |
| JP | 10-101786 | 4/1998 |
| JP | 10-101787 | 4/1998 |
| JP | 2000-169573 | 6/2000 |
| JP | 2002-278100 | 9/2002 |

* cited by examiner

*Primary Examiner*—Terressa M Boykin
(74) *Attorney, Agent, or Firm*—Sughrue Mion, PLLC

(57) ABSTRACT

A polycarbonate copolymer which comprises 30 to 70 mol % of a structural unit comprising a bisphenyl fluorene structure and 70 to 30 mol % of a structural unit comprising tricyclo [5.2.1.0$^{2.6}$] decanedimethanol and causes little occurrence of a birefringence even when extrusion, injection molding or stretch processing is conducted and a process for producing the same.

4 Claims, No Drawings

POLYCARBONATE COPOLYMER AND PROCESS FOR PRODUCING THE SAME

FIELD OF ART

The present invention relates to a polycarbonate copolymer with low birefringence and a process for producing the same.

BACKGROUND OF THE INVENTION

A polycarbonate resin has been applied to various optical materials because it has high transparency, excellent heat resistance and good dynamic properties. Particularly, it has been known that when optical materials such as optical films, optical discs, optical prisms and pickup lenses have large birefringence, various problems such as fuzzy phenomenon in an image formation point of a light transmitted the inside of the material and reading error of information occur. Thus, resins with small birefringence have been developed.

For example, Japanese Patent Kokai (Laid-open) Nos. 6-25398 and 7-109342 disclose an investigation of a whole aromatic polycarbonate resin copolymer used bisphenols having a fluorene structures with large polarizability in the direction of side chain.

Japanese Patent Kokai (Laid-open) Nos. 10-101787 and 10-101786 disclose a homopolycarbonate resin of ether diols having a fluorene structure with large polarizability in the direction of side chain and a phenol skeleton in the direction of normal chain aimed to attain lower photoelastic constant and a copolymer thereof with bisphenols.

Further, Japanese Patent Kokai (Laid-open) No. 2000-169573 suggests, as described in Examples 4, a copolymer of bisphenols having a fluorene structure with large polarizability in the direction of side chain and tricyclodecane [$5.2.1.0^{2,6}$] dimethanol.

As described above, various materials with low birefringence have been developed. The development aims to attain lower photoelastic constant. On the other hand, occurrence of birefringence is not only due to photoelasticity, but also due to molecular orientation during molding or due to stretching. A molded article with such hysterisis has birefringence prior to applying a stress. Birefringence due to deformation hysterisis is generally large than that due to photoelasticity. Since materials are preliminarily subjected to molding or stretching, development for a resin to exhibit low birefringence has been required, even if it is subjected to any operation.

DISCLOSURE OF THE INVENTION

The present invention is to solve the above-mentioned prior problems and to provide a polycarbonate copolymer in which occurrence of birefringence is rare, even if it is subjected to operations such as molding and stretching and a process for producing thereof.

As a result of extensive studies to solve the above-mentioned problems, the inventors have found the problems can be solved by providing a polycarbonate copolymer comprising 30 to 70 mol % of a structural unit represented by the general formula (1) and 70 to 30 mol % of a structural unit represented by the general formula (2);

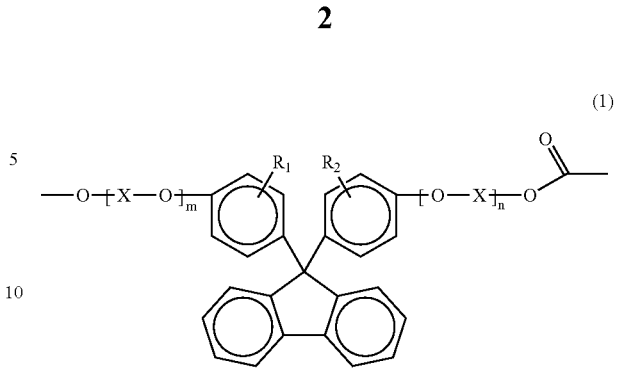

wherein $R_1$ and $R_2$, each independently, are a hydrogen atom, an alkyl group having 1 to 10 carbon atoms, an cycloalkyl group having 6 to 10 carbon atoms or an aryl group having 6 to 10 carbon atoms; X is an alkylene group having 2 to 6 carbon atoms, cycloalkylene group having 6 to 10 carbon atoms or an arylene group having 6 to 10 carbon atoms, which may be branched, and n and m, each independently, are an integer of 1 to 5;

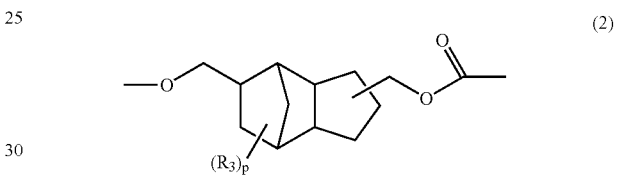

wherein $R_3$ is an alkyl group having 1 to 10 carbon atoms and p is an integer of 0 to 4 and plural $R_3$ may be attached to optional position of tetracyclodecane ring, and have accomplished the present invention.

The polycarbonate resin of the present invention is produced from ether diols represented by the general formula (3) to derive the structural unit (1), diols represented by the general formula (4) to derive the structural unit (2) and a carbonic acid diesters to derive a carbonate bond;

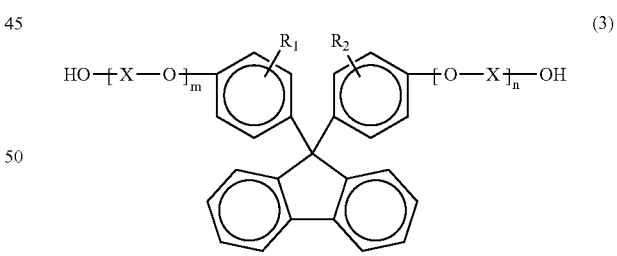

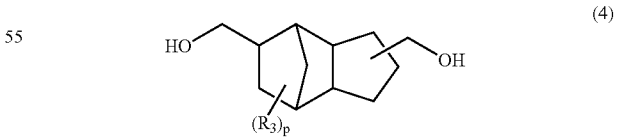

Examples of ether diols represented by the general formula (3) to be used in the present invention include;
9,9-bis(4-(2-hydroxyethoxy)phenyl)fluorene,
9,9-bis(4-(2-hydroxyethoxy)-2-methylphenyl)fluorene,
9,9-bis(4-(2-hydroxyethoxy)-3-methylphenyl)fluorene,
9,9-bis(4-(2-hydroxyethoxy)-2-ethylphenyl)fluorene,
9,9-bis(4-(2-hydroxyethoxy)-3-ethylphenyl)fluorene, 9,9-bis(4-(2-hydroxyethoxy)-2-isopropylphenyl)fluorene,
9,9-bis(4-(2-hydroxyethoxy)-2-isopropylphenyl)fluorene,
9,9-bis(4-(2-hydroxyethoxy)-3-isopropylphenyl)fluorene,
9,9-bis(4-(2-hydroxyethoxy)-2-isobutylphenyl)fluorene,
9,9-bis(4-(2-hydroxyethoxy)-3-isobutylphenyl)fluorene,
9,9-bis(4-(2-hydroxyethoxy)-3-tert-butylphenyl)fluorene,
9,9-bis(4-(2-hydroxyethoxy)-3-cyclohexylphenyl)fluorene,
9,9-bis(4-(2-hydroxyethoxy)-3-phenylphenyl)fluorene,
9,9-bis(4-(2-hydroxyethoxy)-3,5-dimethylphenyl)fluorene,
9,9-bis(4-(2-hydroxyethoxy)-3-tert-butyl-6-methylphenyl) fluorene,
9,9-bis(4-(3-hydroxy-2,2-dimethylpropoxy)phenyl)fluorene,
9,9-bis(4-(6-hydroxy-3-oxapentyloxy)phenyl)fluorene,
and 9,9-bis(4-(9-hydroxy-3,6-dioxaoctyloxy)phenyl)fluorene.

Examples of diols represented by the general formula (4) to be used in the present invention include tricyclo $[5.2.1.0^{2,6}]$ decanedimethanol, 4,10-dimethyltricyclo $[5.2.1.0^{2,6}]$ decanedimethanol, 4,4,10,10-tetramethyltricyclo $[5.2.1.0^{2,6}]$ decanedimethanol and 1,2,3,4,5,6,7,8,9,10-decamethyltricyclo $[5.2.1.0^{2,6}]$ decanedimethanol.

The molar ratio of the structural unit (1) to the structural unit (2) in the present invention is preferably 30/70 to 70/30 and more preferably 40/60 to 50/50. It is the most preferable to use the ratio of 45/55 to 50/50 since it is presumed that birefringence becomes minimum practically around 47/53.

Further, according to Examples and Comparative Examples of the present specification, the more the proportion of the structural unit (2) increases, the smaller a photo-elastic constant as conventional scale becomes, so that photo-elastic constant does not display the minimum value. Therefore, when it is considered that a photoelastic constant is a scale of birefringence as in the past, such result cannot be forecasted. It is surprising that such specific component causes low birefringence contrary to conventional common knowledge.

It is preferable that birefringence (retardation) of a molded sheet is 10 nm or below.

The polycarbonate copolymer of the present invention may have any structure of random-, block- or alternate copolymer. Further, a small amount of structural component other than the structural unit (1) and the structural unit (2) may be contained.

Examples of the structural unit other than the structural unit (1) and the structural unit (2) include the following compounds;
9,9-bis(4-hydroxyphenyl)fluorene,
9,9-bis(3-methyl-4-hydroxyphenyl)fluorene,
bis(4-hydroxy-phenyl)methane,
1,1-bis(4-hydroxyphenyl)ethane,
2,2-bis(4-hydroxyphenyl)propane,
2,2-bis(4-hydroxyphenyl)hexafluoropropane,
2,2-bis(3-methyl-4-hydroxyphenyl)propane,
1,1-bis(4-hydroxyphenyl)-1-phenylethane,
1,1-bis(4-hydroxyphenyl)cyclohexane,
1,1-bis(4-hydroxyphenyl)-3,3,5-trimethylcyclohexane,
α,α'-bis(4-hydroxyphenyl)-α,α,α',α'-tetra-methyl-m-xylene,
α,α'-bis(4-hydroxyphenyl)-α,α,α',α'-tetra-methyl-p-xylene,
pentacyclo$[6.5.1.1^{3,6}.0^{2,7}.0^{9,13}]$pentadecane-dimethanol,
pentacyclo$[9.2.1.1^{4,7}.0^{2,1}.0^{3,8}]$pentadecane-dimethanol,
decalinedimethanol, cyclohexanedimethanol,
3,9-bis(1,1-dimethyl-2-hydroxyethyl)-2,4,8,10-tetra-oxaspiro[5.5]undecane and isosorbide.

The glass transition temperature of the polycarbonate resin in the present invention is preferably at least 95° C. and 165° C. or below and more preferably at least 105° C. and 165° C. or below. When the glass transition temperature is lower than 95° C., it is not preferable since heat resistance deteriorates and environment for use is limited. When the glass transition temperature is higher than 165° C., it is not preferable since flowability deteriorates and molding conditions become rigorous. Further, when its molecular weight is restrained to low molecular weight in order to secure flowability, it is not preferable since it becomes brittle.

The polystyrene-converted weight average molecular weight of the polycarbonate resin to be used in the present invention is preferably 20,000 to 200,000 and more preferably 35,000 to 100,000. When the polystyrene-converted weight average molecular weight is lower than 20,000, it is not preferable since impact resistance deteriorates. When it is more than 200,000, it is not preferable since flow ability deteriorates and molding conditions become rigorous.

The process for producing the polycarbonate copolymer of the present invention is described below.

As the process for producing the polycarbonate copolymer of the present invention, a known melt polycondensation process which comprises reacting diols and carbonic acid diester in the presence of a basic compound catalyst, an esterification catalyst or a mixed catalyst of both thereof is suitably applied.

Examples of carbonic acid diester include diphenyl carbonate, ditolyl carbonate, bis(chlorophenyl)carbonate, m-cresyl carbonate, dimethyl carbonate, diethyl carbonate, dibutyl carbonate and dicyclohexyl carbonate, among which diphenyl carbonate is preferable. Diphenyl carbonate is used preferably in a molar ratio of 0.97 to 1.10 mol and more preferably in a molar ratio of 0.98 to 1.05 mol per total 1 mol of dihydroxy compounds.

Examples of the basic compound catalyst include an alkaline metal compound and/or an alkaline earth metal compound and an nitrogen-containing compound.

As such compounds, organic acid salts, inorganic salts, oxides, hydroxides, hydrides or alkoxides of alkaline metal compound and alkaline earth metal compound, tetraammonium hydroxide and salts thereof and amines are preferably used and these compounds can be used each alone or in the combination there of.

Examples of the alkaline metal compounds include sodium hydroxide, potassium hydroxide, cesium hydroxide, lithium hydroxide, sodium hydrogencarbonate, sodium carbonate, potassium carbonate, cesium carbonate, lithium carbonate, sodium acetate, potassium acetate, cesium acetate, lithium acetate, sodium stearate, potassium stearate, cesium stearate, lithium stearate, sodium hydroborate, sodium phenylborate, sodium benzoate, potassium benzoate, cesium benzoate, lithium benzoate, disodium hydrogenphosphate, dipotassium hydrogenphosphate, dilithium hydrogenphosphate, disodium phenylphosphate, each disodium salt, dipotassium salt, dicesium salt and dilithium salt of bisphenol A and each sodium salt, potassium salt, cesium salt and lithium salt of phenol.

Examples of the alkaline earth metal compounds include magnesium hydroxide, calcium hydroxide, strontium hydroxide, barium hydroxide, magnesium hydrogencarbonate, calcium hydrogencarbonate, strontium hydrogencarbonate, barium hydrogencarbonate, magnesium carbonate calcium carbonate, strontium carbonate, barium carbonate, magnesium acetate, calcium acetate, strontium acetate, barium acetate, magnesium stearate, calcium stearate, calcium benzoate and magnesium phenylphosphate.

Examples of the nitrogen-containing compound include quaternary ammonium hydroxides having alkyl group or aryl group such as tetramethylammonium hydroxide, tetraethylammonium hydroxide, tetrapropylammonium hydroxide, tetrabutylammonium hydroxide and trimethylbenzylammonium hydroxide, tertiary amines such as triethylamine, dimethylbenzylamine and triphenylamine, secondary amines such as diethylamine and dibutylamine, primary amines such as propylamine and butylamine, imidazoles such as 2-methylimidazole, 2-phenylimidazole and benzoimidazole and bases or basic salts such as ammonia, tetramethylammonium borohydride, tetrabutylammonium borohydride, tetrabutylammonium tetraphenylborate and tetraphenylammonium tetraphenylborate.

As a transesterification catalyst, each salt of zinc, tin, zirconium and lead is preferably used. They can be used each alone or in the combination thereof.

Examples of the transesterification catalyst include zinc acetate, zinc benzoate, zinc 2-ethyl hexanoate, tin (II) chloride, tin (IV) chloride, tin (II) acetate, tin (IV) acetate, dibutyltin dilaurate, dibutylitin oxide, dibutyltin dimethoxide, zirconium acetylacetonate, zirconium oxyacetate, zirconium tetrabutoxide, lead (II) acetate and lead (IV) acetate.

The catalyst is used in a molar ratio of $10^{-9}$ to $10^{-3}$ mol and preferably $10^{-7}$ to $10^{-4}$ mol per total 1 mol of the dihydroxy compounds.

Regarding the process for melt polycondensation of the present invention, melt polycondensation is performed by transesterification reaction with heating under atmospheric pressure or a reduced pressure using the above-mentioned raw materials and the catalyst while removing by-products. The reaction is usually performed in multiple stages of at least two stages.

In detail, the first stage reaction is performed at a temperature of 120 to 220° C. and preferably 160 to 200° C. for 0.1 to 5 hours and preferably 0.5 to 3 hours under a pressure of atmospheric pressure to 200 Torr. Then, the temperature is gradually raised up to 230 to 260° C. as the final temperature over 1 to 3 hours and the pressure is gradually reduced to 1 Torr or below as the final pressure, thus continuing the reaction. Finally, polycondensation is continued under a reduced pressure of 1 Torr or below at a temperature of 230 to 260° C. and the pressure is restored with nitrogen at the time reached to a prescribed viscosity, thus completing the reaction. The reaction time under 1 Torr or below is 0.1 to 2 hours and total reaction time is 1 to 6 hours and usually 2 to 5 hours.

The reaction may be conducted in a continuous process or in a batchwise. The reactor to be used in the reaction may be a vertical type reactor equipped with an anchor type stirring blade, a maxblend stirring blade or a helical ribbon type stirring blade or a horizontal type reactor equipped with a paddle blade, a lattice blade or a spectacle blade or an extruder type reactor equipped with a screw blade and a reactor combined thereof considering a viscosity of the polymer is suitably applied.

After the completion of polymerization reaction, the catalyst is removed or deactivated in order to maintain heat stability and hydrolysis stability of the polycarbonate resin of the present invention. Usually, a process for deactivating the catalyst by adding a known acidic substance is suitably applied.

Preferable examples of the acidic substance include aromatic sulfonic acids such as p-toluene sulfonic acid, aromatic sulfonic acid esters such as butyl p-toluene-sulfonate and hexyl p-toluene sulfonate, aromatic sulfonic acid salts such as tetrabutyl phosphonium salt of dodecylbenzene sulfonic acid, organic halides such as stearic chloride, benzoyl chloride and p-toluene-sulfonyl chloride, alkyl sulfuric acids such as dimethyl sulfuric acid and organic halides such as benzyl chloride.

After the deactivation of the catalyst, a step to remove low boiling point compounds in the polymer with vaporization under a pressure of 0.1 to 1 mmHg at a temperature of 200 to 350° C. may be added. For its purpose, a horizontal type apparatus equipped with a stirring blade with excellent surface renewing capacity such as paddle blade, lattice blade and spectacle blade or a thin film vaporizer is suitably used.

Further, in the present invention, an antioxidant, a pigment, a dye, a reinforcing agent, a filler, an ultraviolet absorber, a lubricant, a releasing agent, a crystalline nucleus agent, a plasticizer, a flowability improving agent, an antistatic agent and an antibacterial agent in addition to the above-mentioned heat stabilizer and hydrolysis stabilizer are suitable added.

BEST MODE FOR CARRYING OUT THE INVENTION

The present invention will be described in more detail below, referring to Examples, which are not intended to limit the scope of the present invention.

The properties shown in Examples were measured according to the following methods.

[Polystyrene-Converted Weight Average Molecular Weight (Mw)]

A calibration curve was made using standard polystyrene having a known molecular weight (molecular weight distribution=1) and chloroform as a developing agent. Mw was calculated from retention times of GPC based on the calibration curve.

[Glass Transition Temperature (Tg)]

The measurement was performed by Differential Scanning Calorimeter (DSC), manufactured by Seiko Instrument Co.

Birefringence (retardation) and photoelastic constant were measured according to the following method.

1) Preparation of Cast Film

Each resin obtained in each Example was dissolved in 5 wt % concentration of dichloromethane and drawn out with flow on a cast sheet in which flatness had been confirmed. Dichloromethane was vaporized while adjusting closely its vaporizing amount by setting properly cover on the cast sheet, whereby a transparent resin film of thickness 100μm was obtained.

2) Stretching of Film

The film thus obtained was cut in to 5 cm×5 cm and stretched to stretching fold 1.5 times at a temperature higher by 10° C. than glass transition temperature (Tg) in a stretching rate of 15 mm/minute.

3) Measurement of Birefringence

Birefringence (retardation) of stretched film thus obtained was measured in a wave length of 633 nm by Elliposometer, manufactured by Mizojiri Optical Co., Ltd., Japan.

4) Measurement of Photoelastic Constant

A laser light of wave length 633 nm was irradiated on a cast film prior to stretching by Elliposometer, manufactured by Mizojiri Optical Col, Ltd., Japan and change of birefringence to change of load imposed on the film was measured and photoelastic constant was calculated.

EXAMPLE 1

39.5 g (0.090 mol) of 9,9-bis(4-(2-hydroxyethoxy)phenyl) fluorene (BPEF), 21.6 g (0.110 mol) of tricyclo [$5.2.1.0^{2,6}$] decanedimethanol (TCDDM), 43.7 g (0.204 mol) of diphenyl carbonate and $1.0 \times 10^{-4}$ g ($1.2 \times 10^{-6}$ mol, added as 0.1% aqueous solution) of sodium hydrogencarbonate were charged to a four neck flask of 300 ml equipped with a stirrer and a distiller and heated to 180° C. in a nitrogen atmosphere of 760 mmHg and stirred for 30 minutes. Then, the degree of reduced pressure was adjusted to 150 mmHg and simultaneously the interior temperature was raised to 200° C. at the rate of 60° C./hr and the temperature was maintained for 20 minutes to perform transesterification.

The temperature was further raised to 225° C. at the rate of 75° C./hr. After 10 minutes of the completion of a rise in temperature, the degree of reduced pressure was adjusted to 1 mmHg or below over 1 hour while maintaining the temperature. Then, the temperature was raised to 235° C. at the rate of 60° C./hr and the reaction was further performed for 1.5 hours with stirring.

After the completion of the reaction, nitrogen was injected into the reactor to restore to atmospheric pressure and a polycarbonate resin thus produced was withdrawn. Measurement results of properties of the polycarbonate copolymer thus obtained are shown in Table 1.

EXAMPLES 2 to 6

The experiments were conducted in the same manner as in Example 1 except that each ratio of BPEF and TCDDM in Example 1 was changed as shown in Table 1. The results are shown in Table 1.

COMPARATIVE EXAMPLES 1 to 3

The experiments were conducted in the same manner as in Example 1 except that each ratio of BPEF and TCDDM in Example 1 was changed as shown in Table 1. The results are shown in Table 1.

INDUSTRIAL APPLICABILITY

The polycarbonate resin of the present invention is very useful as an optical material to be used for optical film, optical disc, optical prism and pick-up lens since it has essentially low birefringence and low birefringence is maintained even in each operation of molding and stretching.

What is claimed is:

1. A polycarbonate copolymer comprising 30 to 70 mol % of a structural unit represented by the general formula (1) and 70 to 30 mol % of a structural unit represented by the general formula (2);

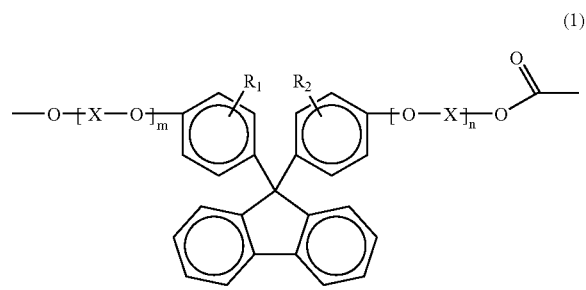

(1)

wherein $R_1$ and $R_2$, each independently, are a hydrogen atom, an alkyl group having 1 to 10 carbon atoms, a cycloalkyl group having 6 to 10 carbon atoms or an aryl group having 6 to 10 carbon atoms; X is an alkylene group having 2 to 6 carbon atoms, a cycloalkylene group having 6 to 10 carbon atoms or an arylene group having 6 to 10 carbon atoms, which may be branched and n and m, each independently, are an integer of 1 to 5;

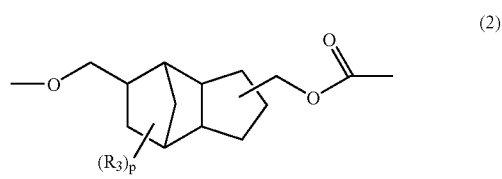

(2)

wherein $R_3$ is an alkyl group having 1 to 10 carbon atoms and p is an integer of 0 to 4 and plural $R_3$ may be attached to an optional position of the tetracyclodecane ring.

2. A process for producing the polycarbonate copolymer described in claim 1 which comprises the steps of:

charging a mixture of a dihydroxy compound represented by the general formula (3) and a dihydroxy compound represented by the general formula (4) in a molar ratio ((3)/(4)) of 30/70 to 70/30, a carbonic acid diester and a polymerization catalyst to a reactor,

TABLE 1

|  | BPEF [mol %] | TCDDM [mol %] | Mw | Tg [° C.] | Birefringence ($\Delta$ nd) [nm] | Photoealstic constant ($\times 10^{-12}$) [$m^2/N$] |
|---|---|---|---|---|---|---|
| Example 1 | 45 | 55 | 63200 | 124 | 1.0 | 23.6 |
| Example 2 | 30 | 70 | 64100 | 114 | 9.5 | 21.3 |
| Example 3 | 40 | 60 | 60800 | 121 | 3.7 | 22.3 |
| Example 4 | 50 | 50 | 65200 | 128 | 1.2 | 24.5 |
| Example 5 | 60 | 40 | 66800 | 133 | 5.2 | 26.1 |
| Example 6 | 70 | 30 | 62500 | 138 | 8.4 | 27.7 |
| Comp. Ex. 1 | 20 | 80 | 62100 | 107 | 16.1 | 19.5 |
| Comp. Ex. 2 | 80 | 20 | 61000 | 143 | 10.7 | 29.1 |
| Comp. Ex. 3 | 100 | 0 | 59300 | 153 | 12.8 | 32.6 |

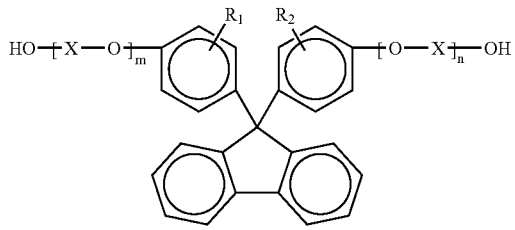
(3)

wherein $R_1$ and $R_2$, each independently, are a hydrogen atom, an alkyl group having 1 to 10 carbon atoms, a cycloalkyl group having 6 to 10 carbon atoms or an aryl group having 6 to 10 carbon atoms; X is an alkylene group having 2 to 6 carbon atoms, a cycloalkylene group having 6 to 10 carbon atoms or an arylene group having 6 to 10 carbon atoms, which may be branched and n and m, each independently, are an integer of 1 to 5;

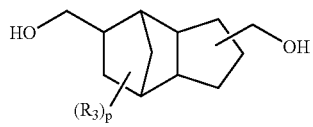
(4)

wherein $R_3$ is an alkyl group having 1 to 10 carbon atoms and p is an integer of 0 to 4 and plural $R_3$ may be attached to an optional position of the tetracyclodecane ring, then performing transesterification at a temperature of 120 to 220° C. under a pressure of atmospheric pressure to 200 Torr in a nitrogen atmosphere, then, performing melt polycondensation while gradually raising the temperature up to 230 to 260° C. as a final temperature and gradually reducing the pressure to 1 Torr or below as a final pressure, finally, continuing polycondensation at a temperature of 230 to 260° C. under a reduced pressure of 1 Torr or below, thus, completing polycondensation, after the completion of polycondensation, removing or deactivating the catalyst, then restoring the reactor interior pressure with nitrogen, and then, withdrawing a reaction product, thereby obtaining a polycarbonate copolymer.

3. The polycarbonate copolymer according to claim 1, wherein $R_1$ and $R_2$ each are a hydrogen atom; n and m each are 1; X is an alkylene group having 2 carbon atoms and p is 0.

4. The process for producing the polycarbonate copolymer according to claim 2, wherein $R_1$ and $R_2$ each are a hydrogen atom; n and m each are 1; X is an alkylene group having 2 carbon atoms and p is 0.

* * * * *